Aug. 4, 1964   R. J. BARBER ETAL   3,143,450
METHOD FOR THE MANUFACTURE OF PNEUMATIC TIRES
Filed Dec. 24, 1958   2 Sheets-Sheet 1

INVENTORS
Ronald Jesse Barber
Jack Milner Lowe
by Benj. T. Rauber
their attorney

United States Patent Office 3,143,450
Patented Aug. 4, 1964

3,143,450
METHOD FOR THE MANUFACTURE OF PNEUMATIC TIRES
Ronald Jesse Barber, Erdington, Birmingham, and Jack Milner Lowe, Sutton Coldfield, England, assignors, by mesne assignments, to Dunlop Tire and Rubber Corporation, Buffalo, N.Y., a corporation of New York
Filed Dec. 24, 1958, Ser. No. 782,728
Claims priority, application Great Britain Jan. 15, 1958
4 Claims. (Cl. 156—126)

This invention relates to a method and apparatus for the manufacture of pneumatic tires.

Accurate location of the tread or the tread and breaker relative to a tire carcass, during the manufacture of pneumatic tires, presents considerable difficulty and it is essential that this condition should be achieved, particularly when steel cord breakers are utilized, in order to produce a tire of balanced construction and of uniform running characteristics.

The operation is usually carried out manually, and is therefore subject to inaccuracies on account of the human factor, and takes a considerable length of time.

It is an object of the present invention to provide a method and an apparatus for the manufacture of pneumatic tires which results in accurate location of the tread or the tread and breaker relative to a tire carcass.

According to the present invention a method for the manufacture of pneumatic tires comprises disposing unvulcanized tread rubber symmetrically around the inner peripheral surface of a tread molding ring, accurately locating the ring symmetrically and coaxially with respect to a carcass supported on a building drum, expanding the carcass until its crown portion is secured to the tread in the ring and subsequently molding and vulcanizing the completed cover carried in the ring.

A breaker may be accurately located on the inner periphery of the tread rubber or may, alternatively be accurately located on the outer periphery of the flat or partially shaped carcass prior to full shaping of the carcass to secure it to the tread.

The invention also includes pneumatic tires manufactured by the method and the apparatus in accordance with the invention.

According to the invention also apparatus for the manufacture of pneumatic tires comprises an inflatable building drum upon which to build and shape a pneumatic tire carcass, means for inflating the said drum, a tread molding ring, and means for accurately locating the said ring symmetrically and coaxially with respect to a carcass carried on the drum.

The method of manufacture in accordance with the present invention may be carried out, for example, in conjunction with the tire building apparatus described in our co-pending patent application Ser. No. 785,247, filed January 6, 1959, now Patent No. 3,014,521. This application discloses a method of tire building in which carcass fabrics are wound on an inflatable cylindrical former supported at its ends and in which bead wires are then gripped on the wrapped fabric inwardly of the ends thereof and the entire structure inflated to tire form.

One embodiment of the invention will now be described by way of example, with reference to FIGURES 1–6 of the accompanying drawings, in which.

Figure 1:
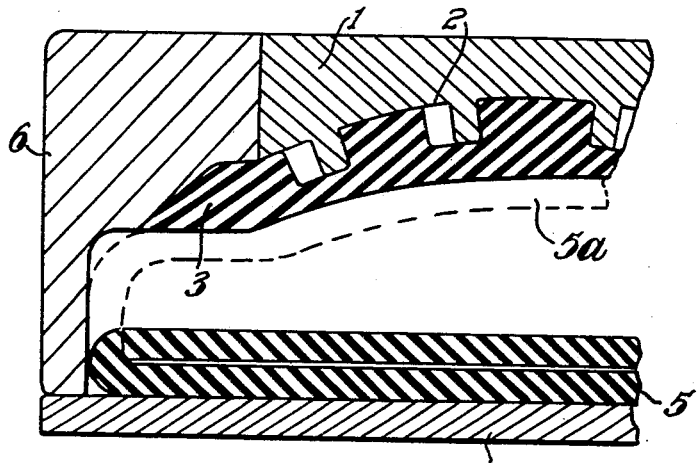
FIGURE 1 is a diagrammatic axial cross-sectional view of part of a tread molding ring and associated apparatus, showing the operation of the apparatus to press a tread strip into the tread molding ring.

The tread molding ring 1, having, on its inner periphery, a plurality of grooves 2 forming a tread molding matrix, has located symmetrically therein a length of extruded unvulcanized tread rubber 3, still hot from the extrusion process, the length of rubber being of the correct weight and extending around the whole inner periphery of the tread molding ring 1. A cylindrical support 4 carrying on its outer periphery an annular air bag 5, is located coaxially and symmetrically within the tread ring 1 carrying the tread rubber 3. The air bag 5 is also shown in its inflated state in dotted lines at 5a in FIGURE 1. Side rings 6, only one of which is shown in FIGURE 1, are located one on each side of the tread ring 1 and cylindrical support assembly 4 so as to enclose the air bag and tread rubber. The air bag is then inflated so as to force the tread rubber into the grooves 2 of the matrix, which may be provided with heating means (not illustrated) to make the rubber flow more easily.

In an alternative method, a length of hot or cold extruded tread rubber of the correct weight is wrapped around the periphery of the deflated air bag 5 carried by the cylindrical support 4 and the air bag is inflated to transfer the tread rubber onto the inner peripheral surface of the surrounding tread ring 1.

Figure 2:
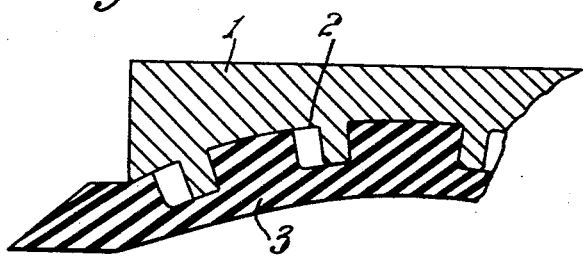
FIGURE 2 is a similar view to that shown in FIGURE 1 of the tread molding ring, showing the tread strip in the ring.

The air bag 5 is then deflated and removed, together with its support 4 and the side rings 6, from the tread ring 1, the tread ring containing the tread being shown in FIGURE 2.

Figure 3:
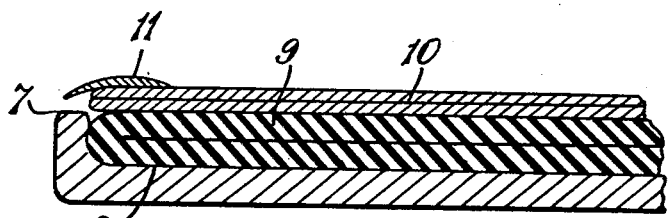
FIGURE 3 is a diagrammatic axial cross-sectional view of a breaker carried by an airbag on a cylindrical support.

FIGURE 3 shows a second cylindrical support 7 having, on its outer periphery, an annular recess 8 containing a second annular air-bag 9 and having a breaker 10 built symmetrically on the external peripheral surface of the air bag. The breaker 10 may be a winding of a cord or cords of, for example, textile or steel, or may be built, in the usual manner, from plies comprising parallel cords of such materials. The outside diameter of the second air bag in its collapsed state is such that the outside diameter of the breaker 10 is somewhat less than the internal diameter of the tread rubber 3 within the tread moulding ring 1. A pair of soft rubber annuli 11, one of which is shown in each of FIGURES 3–6 is provided, one at each edge of the breaker 10.

Figure 4:
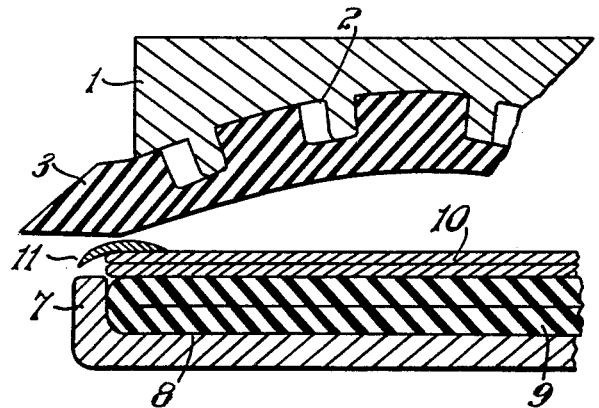
FIGURES 4–6 are diagrammatic axial cross-sectional views of the tread, breaker and associated apparatus shown in FIGURES 2 and 3, showing the operation of the apparatus to expand the breaker into engagement with the tread.

The second cylindrical support 7 carrying the breaker 10 is moved into the position shown in FIGURE 4 where it is located symmetrically and coaxially within the tread moulding ring 1 carrying the tread rubber 3. (See FIGURE 4.)

Figure 5:
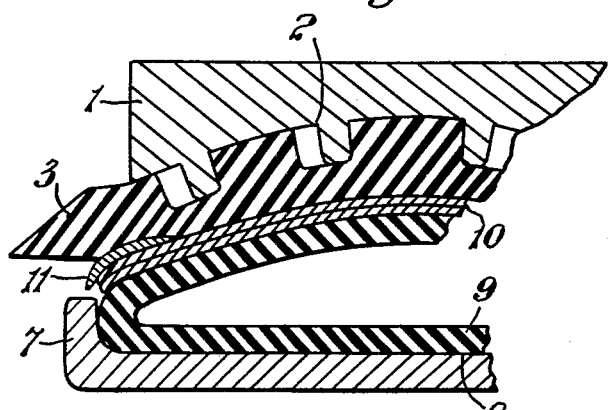
Figure 6:
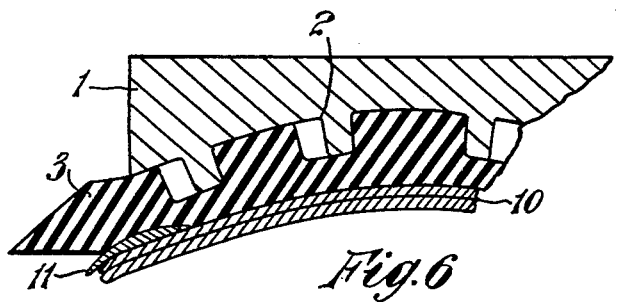

The air bag 9 is then inflated to expand the breaker and the annuli 11 firmly and accurately into position against the tread rubber 3 as shown in FIGURE 5. The air bag 9 is then deflated and the air bag and the second cylindrical member 7 removed from the interior of the tread molding ring (see FIGURE 6).

The tread molding ring carrying the tread rubber and breaker is then located by means of supporting members coaxially and symmetrically in position with respect to a tire carcass mounted on an inflatable radially expansible diaphragm (not illustrated). The diaphragm is then inflated so as to shape the carcass into the tread and breaker carried by the molding ring.

A pneumatic tire is thus formed having a tread and breaker which are symmetrically and coaxially located with respect to the carcass and the assembly is subsequently moulded and vulcanized resulting in a tire which has a balanced construction and uniform running characteristics.

In the particular embodiment just described, it will be appreciated that there is very little distortion of the breaker during the construction of the tire since it is built at the maximum possible diameter in relation to a rubber tread already forced into engagement with the grooves formed in the mold matrix. By comparison, in the conventional construction of pneumatic tires, a breaker is considerably distorted by inflation and expansion of the carcass during the initial forming stage and further distorted, after it has been located within a mould, by the additional expansion necessary to force the tread rubber into engagement with the grooves in the mold matrix.

Having now described my invention, what we claim is:

1. A method for the manufacture of pneumatic tires which comprises molding an annulus of unvulcanized tread composition radially outwardly into a tread molding ring having an inner surface indented with a tread molding pattern, placing an annular breaker symmetrically and coaxially within and in contact with the inner surface of said annulus of unvulcanized tread composition in said molding ring, placing said assembly of tread annulus and breaker coaxially and symmetrically about an unvulcanized carcass on an expansible building surface, expanding said building surface and carcass into union with said breaker strip and molding and vulcanizing said assembly of carcass, breaker and annulus.

2. A method for the manufacture of pneumatic tires according to claim 1 wherein the breaker is placed symmetrically and coaxially within and in contact with the inner peripheral surface of the tread rubber by disposing the breaker around an inflatable support, accurately locating the ring containing the tread rubber symmetrically and coaxially with respect to the breaker and inflating the support to expand the breaker into engagement with the tread in the ring.

3. A method for the manufacture of pneumatic tires which comprises molding an annulus of unvulcanized tread composition radially outwardly into a tread molding ring having an inner surface indented with a tread molding pattern supporting a carcass on an inflatable building surface, partially shaping the carcass, applying a breaker to the carcass, placing the tread molding ring and molded tread composition symmetrically and coaxially relative to the breaker and carcass, expanding the carcass and breaker until the breaker is secured to said tread composition on said tread molding ring and subsequently molding and vulcanizing the assembly of carcass, breaker and tread.

4. A method for the manufacture of pneumatic tires according to claim 1 wherein the tread composition is placed on the tread molding ring having an inner surface indented with a tread molding pattern by arranging a strip of unvulcanized tread composition of a length required to form a tread in annular form around an inflatable support, disposing the tread molding ring having an inner surface indented with a tread molding pattern coaxially and symmetrically around the tread on the support and inflating the support to expand the tread rubber into the tread molding ring.

References Cited in the file of this patent

UNITED STATES PATENTS

| | | |
|---|---|---|
| 1,525,455 | Logan | Feb. 10, 1925 |
| 1,692,128 | Kilborn | Nov. 20, 1928 |
| 2,139,840 | McKone | Dec. 13, 1938 |
| 2,614,056 | Kraft | Oct. 14, 1952 |
| 2,649,891 | Hinman | Aug. 25, 1953 |
| 2,672,914 | Weigold | Mar. 23, 1954 |
| 2,814,331 | Vanzo | Nov. 26, 1957 |

FOREIGN PATENTS

| | | |
|---|---|---|
| 555,680 | Great Britain | Sept. 2, 1943 |